United States Patent
Setterberg et al.

(10) Patent No.: US 9,842,245 B1
(45) Date of Patent: *Dec. 12, 2017

(54) FINGERPRINT SENSING SYSTEM WITH LIVENESS DETECTION

(71) Applicant: Fingerprint Cards AB, Göteborg (SE)

(72) Inventors: Eric Setterberg, Västra Frölunda (SE); Frank Riedijk, Delft (NL)

(73) Assignee: FINGERPRINT CARDS AB, Göteborg (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/622,638

(22) Filed: Jun. 14, 2017

(30) Foreign Application Priority Data

Nov. 11, 2016 (SE) .................................. 16514796

(51) Int. Cl.
  *G06K 9/00* (2006.01)
(52) U.S. Cl.
  CPC ......... *G06K 9/0012* (2013.01); *G06K 9/0002* (2013.01); *G06K 9/00087* (2013.01)
(58) Field of Classification Search
  None
  See application file for complete search history.

(56) References Cited

U.S. PATENT DOCUMENTS

| 6,181,808 B1 | 1/2001 | Fukuzumi |
| 2006/0034493 A1 | 2/2006 | Shimamura et al. |
| 2007/0290124 A1 | 12/2007 | Neil et al. |
| 2014/0270416 A1 | 9/2014 | Minteer et al. |
| 2015/0043791 A1 | 2/2015 | Setlak et al. |

FOREIGN PATENT DOCUMENTS

| WO | 2010051041 A1 | 5/2010 |
| WO | 2012158950 A1 | 11/2012 |

OTHER PUBLICATIONS

Matthew, P., et al. "Developing Coercion Detection Solutions for Biometric Security", 2016 SAI Computing Conference, Jul. 13-15, 2016, London, UK.
Swedish Search Report for Swedish Application No. 1651479-6 dated May 22, 2017, 3 pages.

*Primary Examiner* — Sumati Lefkowitz
*Assistant Examiner* — Jiangeng Sun
(74) *Attorney, Agent, or Firm* — RMCK Law Group PLC

(57) ABSTRACT

The present invention relates to a method of controlling a fingerprint sensing system for liveness authentication. The method comprising acquiring a first set of sensing signals and a second set of sensing signals from a fingerprint sensor in two different operational modes and subsequently provide a liveness authentication signal based on the first set of sensing signals and the second set of sensing signals. The invention also relates to a fingerprint sensing system and an electronic device.

18 Claims, 10 Drawing Sheets

FINGERPRINT SENSING SYSTEM WITH LIVENESS DETECTION

FIELD OF THE INVENTION

The present invention relates to a method of controlling a fingerprint sensing system for liveness authentication, to a fingerprint sensing system, and to an electronic device.

BACKGROUND OF THE INVENTION

Various types of biometric systems are used more and more in order to provide an increased security for accessing an electronic device and at the same time keep the user convenience at an acceptable level. In particular fingerprint sensors have been successfully integrated in such devices, for example, thanks to their small form factor, high performance and user acceptance. Among the various available fingerprint sensing principles (such as capacitive, optical, thermal etc.), capacitive sensing is most commonly used, in particular in applications where size and power consumption are important.

All capacitive fingerprint sensors provide an indicative measure of the capacitance between several sensing elements and a finger placed on the surface of the fingerprint sensor. Acquisition of a fingerprint image is typically performed using a fingerprint sensor comprising a plurality of sensing elements arranged in a two-dimensional manner, and a block based technique may be applied to the fingerprint sensor for acquiring a fingerprint image, where the blocks of sensing elements are sampled sequentially.

One of the problems associated with fingerprint sensors concerns so-called spoof fingers trying to mimic a live fingerprint to thereby deceive a fingerprint sensor. If fraud by the spoof finger is successful, unauthorized access to systems may undesirably be approved or unauthorized transactions may be approved which may lead to disastrous consequences. Furthermore, a spoof finger is relatively easy to produce which may eventually lead to an increasing number of fraud attempts, in particular as fingerprint sensors become more and more common as a means for authentication.

US2014270416 discloses a fingerprint sensing device with spoof detection capabilities which are interleaved with the acquisition of finger biometric data using sub-arrays of finger sensing pixels. A finger drive electrode is arranged adjacent to the finger sensing pixels to supply a voltage pulse to a finger or object (e.g. spoof finger) placed on the finger sensing pixels. For spoof detection, the finger or object is subjected to a voltage pulse via the finger drive electrode and the sub-array of finger sensing pixels is configured to sense the response from the finger or object. Spoof detection is thereafter based on the characteristics of the response which is affected by the conductance of the finger or object.

However, the spoof detection capability disclosed in US2014270416 is sensitive to the resistance of the finger (or the spoof object). The sensitivity to resistance of the finger also applies to the driving of the finger potential via the finger drive electrode for acquisition of finger biometric data, thereby reducing the quality of the acquired images. One way to reduce the influence of the resistance of the finger is to ground the finger and drive the circuitry associated with the drive signal. This way, images may be acquired which are less affected by the resistivity of the finger. On the other hand, this opens up for a larger selection of viable spoof materials due to the reduced sensitivity to the resistivity of the object or finger.

Thus, there is a need for improvement with regards to increasing the level of security in user authentication with fingerprint sensors.

SUMMARY

In view of above-mentioned and other drawbacks of the prior art, it is an object of the present invention to provide an improved fingerprint sensing system and method, that provides for improved user authentication security.

According to a first aspect of the present invention, it is therefore provided a method of controlling a fingerprint sensing system comprising: a device connection interface for connection of the fingerprint sensing system to an electronic device, the device connection interface including a device reference potential input for receiving a device reference potential from the electronic device; a sensing arrangement including: a plurality of sensing structures, each being covered by a dielectric structure and being arranged to capacitively couple to the finger when the finger is placed on the dielectric structure; and read-out circuitry connected to each of the sensing structures for providing sensing signals indicative of a capacitive coupling between each sensing structure and the finger in response to a change in potential difference between a sensing structure potential of the sensing structure and a finger potential of the finger, the read-out circuitry being connected to each of the sensing structures in such a way that the sensing structure potential follows a sensing reference potential of the sensing arrangement, a finger drive structure arranged adjacent to the sensing structures for making electrical contact with the finger when sensing the fingerprint pattern; and supply circuitry connected to the sensing arrangement for providing, to the sensing arrangement, the sensing reference potential, wherein the method comprises: providing the sensing reference potential to the sensing arrangement in the form of a sensing reference signal alternating, in relation to the device reference potential, between a first sensing reference potential and a second sensing reference potential, a change in potential difference, in relation to the device reference potential, between the first sensing reference potential and the second sensing reference potential resulting in the change in potential difference between the finger potential and the sensing structure potential; providing a first set of sensing signals to a control circuitry; providing the sensing reference potential to the finger drive electrode in the form of a sensing reference signal alternating, in relation to the device reference potential, between a third sensing reference potential and a fourth sensing reference potential, a change in potential difference, in relation to the device reference potential, between the third sensing reference potential and the fourth sensing reference potential resulting in the change in potential difference between the finger potential and the sensing structure potential, providing a second set of sensing signals to the control circuitry; providing a liveness authentication signal based on the first set of sensing signals and the second set of sensing signals.

The device reference potential may be any reference potential for the electronic device, such as device ground (0 V in relation to device ground) or device supply voltage (such as 1.8 V in relation to device ground).

The electronic device may, for example, be a portable electronic device, such as a mobile phone, a smart watch, or a chip card (a so-called smart card). Furthermore, the electronic device may be a sub-system comprised in a more complex apparatus, such as a vehicle.

The read-out circuitry may include circuitry for converting analog signals to digital signals. Such circuitry may include at least one analog to digital converter circuit. In such embodiments, the fingerprint sensing system may thus provide a fingerprint pattern signal as a digital signal. In other embodiments, the fingerprint pattern signal may be provided as an analog signal.

The sensing structures may advantageously be provided in the form of metal plates, so that parallel plate capacitors are formed by the sensing structures (the sensing plates), the finger surface, and the dielectric structure covering the sensing structures (and any air that may locally exist between the finger surface and the dielectric structure).

The dielectric structure may advantageously be at least 20 µm thick and have a high dielectric strength to protect the underlying structures of the fingerprint sensing device from wear and tear as well as ESD (electrostatic discharge). Even more advantageously, the dielectric structure may be at least 50 µm thick. In embodiments, the dielectric structure may be several hundred µm thick. For instance, the dielectric structure may be at least partly constituted by a structural part of the electronic device, such as a cover glass or a laminate.

That the read-out circuitry is connected to each of the sensing structures in such a way that the sensing structure potential substantially follows the sensing reference potential of the sensing arrangement should be understood to mean that a change of the sensing reference potential results in a substantially corresponding change in the sensing structure potential. Depending on the configuration of the read-out circuitry, the sensing structure potential may be substantially the same as the sensing reference potential, or there may be a substantially constant potential difference between the sensing reference potential and the sensing structure potential.

It should be noted that the finger potential of the finger can generally be assumed to be substantially constant in relation to the device reference potential in the first operational mode, at least during the time needed for the read-out circuitry to carry out a sensing operation. In the second operational mode, the finger potential alternates in relation to the potential of the sensing structures.

The first sensing reference potential may be substantially the same as the third sensing reference potential, and the second sensing reference potential may be substantially the same as the fourth sensing reference potential. However, the relationship between the sensing reference potentials in the two different modes of operation may also differ depending on application specific parameters.

The present invention is based upon the realization that improved authentication security may be achieved by switching between two types of fingerprint acquisition techniques, a first mode where the potential of the sensing elements is alternated for acquiring sensing signals and a second mode where the potential of the finger is alternated for acquiring sensing signals. In the first mode, the acquired sensing signals are less influenced by the resistance between the finger and the fingerprint sensing structures (e.g. the bezel) compared to in the second mode. For example, in the first mode the dryness of the finger is not of high importance whereas the dryness of the finger influences the sensing signals to a larger extent in the second mode. This means that in the different modes separately, although efficient for liveness detection in their own way, a different span of spoof materials may be viable. It is thus realized that liveness detection may be improved by switching between the two modes and then compare the sensing signals acquired in the different modes.

Examples of spoof materials include gelatin, wood, glue, conductive silicone and rubbers, epoxy, and other plastic materials, etc.

According to various embodiments of the present invention, the first set of sensing signals and the second set of sensing signals may be acquired from capacitive coupling between the finger and the same set of sensing structures. In other words, the same sensing structures are used in the first sensing mode and in the second sensing mode for acquiring the first and the second set of sensing signals. This advantageously provides accuracy between the area of the finger which the first set of sensing signals is representative of and the area of the finger which the second set of sensing signals is representative of.

According to an embodiment of the invention, the liveness parameter may be a comparison between a first signal of the first set of sensing signals and a second signal of the second set of sensing signals, wherein the method comprises: when the liveness parameter is in a threshold interval, providing the liveness authentication signal indicative of a live finger. This provides a simple and straight forward way to determine liveness of the object. The comparison may for example be a ratio between the first signal and the second signal, or between the second signal and the first signal. Alternatively, the comparison is the difference between the first value and the second value (or vice versa). The liveness parameter based on the comparison may be finger specific, i.e. based on a specific user's fingerprint, or it may be global, e.g. based on more general fingerprint pattern characteristics not specific to a certain user.

In a further embodiment, the liveness parameter may be a comparison between a first accumulated value of the first set of sensing signals and a second accumulated value of the second set of sensing signals, wherein the method comprises: when the liveness parameter is in a threshold interval, providing the liveness authentication signal indicative of a live finger. The accumulated value may be accumulated from all the active sensing structures such as a sum of the sensing signals. Thus, the first accumulated value may be a sum of all the sensing signals in the first set of sensing signals and the second accumulated value may be a sum of all the sensing signals in the second set of sensing signals.

According to an embodiment of the invention, the method may comprise including the liveness parameter in a set of liveness parameters, applying a liveness test on the set of liveness parameters, and based on the test, provide a liveness authentication signal indicative of a live finger or a spoof finger. Thus, the liveness parameter may advantageously be part of the liveness test functionality of the electronic device.

According to an embodiment of the invention, the method may comprise determining a verification representation based on the first set of signals and the liveness parameter, performing a fingerprint authentication procedure based on the verification representation and an enrolment representation indicative of a fingerprint pattern, the enrolment representation including an enrolment liveness parameter based on a first set of enrolment sensing signals provided in the first operational mode and a second set of enrolment sensing signals provided in the second operational mode. Accordingly, the enrolment template may also include a previously determined liveness parameter. For authentication a verification liveness parameter is compared with the enrolment liveness parameter. Thereby, the liveness test is advantageously included in the overall authentication and enrolment procedure allowing for improved authentication security.

Authentication may comprise multiple steps; and the process thereof of deciding whether a fingerprint comes from the same individual as an enrolled fingerprint is commonly denoted verification. Another step of authentication is to decide whether a fingerprint image acquired by the fingerprint sensor comes from a live finger of a live individual or, alternatively, comes from an imitated or spoof finger or portion thereof in an attempt to gain unauthorized access. This step is sometimes referred to as liveness or liveness detection.

According to a second aspect of the present invention, there is provided a fingerprint sensing system for sensing a fingerprint pattern of a finger, the fingerprint sensing system comprising: a device connection interface for connection of the fingerprint sensing system to an electronic device, the device connection interface including a device reference potential input for receiving a device reference potential from the electronic device; a sensing arrangement including: a plurality of sensing structures, each being covered by a dielectric structure and being arranged to capacitively couple to the finger when the finger is placed on the dielectric structure; read-out circuitry connected to each of the sensing structures for providing sensing signals indicative of a capacitive coupling between each sensing structure and the finger in response to a change in potential difference between a sensing structure potential of the sensing structure and a finger potential of the finger, a finger drive structure arranged adjacent to the sensing structures for making electrical contact with the finger when sensing the fingerprint pattern, supply circuitry connected to the sensing arrangement for providing, to the sensing arrangement, the sensing reference potential, wherein the sensing arrangement further comprises a sensing arrangement controller for controlling the sensing arrangement between: a first sensing operational mode in which the read-out circuitry is connected to each of the sensing structures in such a way that the sensing structure potential follows a sensing reference potential of the sensing arrangement, wherein the sensing reference potential is provided in the form of a sensing reference signal alternating, in relation to the device reference potential, between a first sensing reference potential and a second sensing reference potential, a change in potential difference, in relation to the device reference potential, between the first sensing reference potential and the second sensing reference potential resulting in the change in potential difference between the finger potential and the sensing structure potential, wherein a first set of sensing signals is provided by the read-out circuitry, and a second sensing operational mode in which the sensing reference potential is provided to the finger drive electrode in the form of a sensing reference signal alternating, in relation to the device reference potential, between a third sensing reference potential and a fourth sensing reference potential, a change in potential difference, in relation to the device reference potential, between the first sensing reference potential and the second sensing reference potential resulting in the change in potential difference between the finger potential and the sensing structure potential, wherein a second set of sensing signals is provided by the read-out circuitry, and control circuitry configured to determine a liveness parameter based on the first set of sensing signals and the second set of sensing signals, and based on the liveness parameter, provide a liveness authentication signal.

Advantageously, the same set of sensing structures is used in the first mode and in the second mode for sensing the first sensing signals and the second sensing signals.

According to embodiments of the fingerprint sensing system according to the present invention, the liveness parameter is a comparison between a first signal of the first set of sensing signals and a second signal of the second set of sensing signals, wherein when the liveness parameter is determined to be in a threshold interval, provide the liveness authentication signal indicative of a live finger.

Alternatively, according to another embodiment of the invention, the liveness parameter is a comparison between a first accumulated value of the first set of sensing signals and a second accumulated value of the second set of sensing signals, wherein when the liveness parameter is in a threshold interval, provide the liveness authentication signal indicative of a live finger.

A further implementation according to embodiments of the fingerprint sensing system according to the present invention includes that the control circuitry is configured to: determine a verification representation based on the first set of signals and the liveness parameter, perform a fingerprint authentication procedure based on the verification representation and an enrolment representation indicative of a user's fingerprint pattern, the enrolment representation including an enrolment liveness parameter based on a first set of enrolment sensing signals provided in the first operational mode and a second set of enrolment sensing signals provided in the second operational mode.

The read-out circuitry may advantageously be configured to sense a change in charge carried by each of the sensing structures resulting from the change in potential difference, the read-out circuitry comprises: a plurality of charge amplifiers, each being connected to at least one of the sensing structures for providing a sensing signal indicative of a change in charge carried by the at least one sensing structure, wherein each of the charge amplifiers comprises: a first input connected to the at least one sensing structure; a second input connected to the supply circuitry to receive the sensing reference potential; an output providing the sensing signal; a feedback capacitor connected between the first input and the output; and at least one amplifier stage between the first and second inputs, and the output, wherein the charge amplifier is configured in such a way that a potential at the first input substantially follows the sensing reference potential at the second input.

Each charge amplifier converts charge at the first input (sometimes referred to as the negative input) to a voltage at the output. The gain of the charge amplifier is determined by the capacitance of the feedback capacitor.

That the charge amplifier is configured in such a way that the potential at the first input substantially follows the potential at the second input (sometimes referred to as the positive input) should be understood to mean that a change in the potential at the second input results in a substantially corresponding change in the potential at the first input. Depending on the actual configuration of the charge amplifier, the potential at the first input may be substantially the same as the potential at the second input, or there may be a substantially constant potential difference between the second input and the first input. If, for instance, the charge amplifier is configured as a single stage amplifier, the potential difference may be the gate-source voltage of the transistor of the single stage amplifier.

It should be noted that the output of the charge amplifier need not be directly connected to the feedback capacitor, and that there may be additional circuitry between the output and the feedback capacitor.

Advantageously, the read-out circuitry may further comprise sampling circuitry connected to the output of each of the charge amplifiers for sampling the sensing signals at sampling times being related to changes of the sensing reference potential between the first sensing reference potential and the second sensing reference potential or between the third sensing reference potential and the fourth sensing reference potential.

In embodiments, the sampling circuitry may be controlled to sample the output a first time when the sensing reference potential is at either the first sensing reference potential or the second sensing reference potential, and a second time when the sensing reference potential is at the other one of the first sensing reference potential and the second sensing reference potential. The sampling circuitry may further be controlled to sample the output a third time when the sensing reference potential is at either the third sensing reference potential or the fourth sensing reference potential, and a third time when the sensing reference potential is at the other one of the third sensing reference potential and the fourth sensing reference potential.

The procedure of sampling the sensing signal at first and second sampling times is generally referred to as correlated double sampling and removes much of the offset as well as at least low-frequency components of the common mode noise that the fingerprint sensing system may be subjected to.

In various embodiments of the fingerprint sensing system according to the present invention, the sensing arrangement may be included in a first integrated circuit; and the device connection interface and the sensing reference potential providing circuit may be included in a second integrated circuit coupled to the first integrated circuit.

In these embodiments, the first integrated circuit may further comprise a sensing arrangement interface; and the second integrated circuit may further comprise a sensor connection interface connected to the sensing arrangement interface.

The first integrated circuit (fingerprint sensor component) may be an SPI (Serial Peripheral Interface) slave, and the sensing arrangement interface may be an SPI port comprising a serial clock input (SCLK); a master output slave input (MOSI), a slave select input (CS); and a master input slave output (MISO).

According to various embodiments the sensing arrangement, the device connection interface, and the supply circuitry may be included in a single integrated circuit.

Further embodiments of, and effects obtained through this second aspect of the present invention are largely analogous to those described above for the first aspect of the invention.

The fingerprint sensing system according to embodiments of the present invention may, furthermore, advantageously be included in an electronic device, further comprising processing circuitry configured to: acquire the sensing signals and the liveness parameter from the fingerprint sensing system via the device connection interface; authenticate a user based on the fingerprint pattern signal; and perform at least one action only if the user is authenticated based on the sensing signals and the liveness parameter.

In the context of the present application, the "enrolment representation" and/or the "verification representation" of a fingerprint image may be any information extracted from the fingerprint image, which is useful for assessing the similarity between fingerprint images acquired at different times. For instance, the enrolment/verification representation of the fingerprint image may comprise descriptions of fingerprint features (such as so-called minutiae) and information about the positional relationship between the fingerprint features. Alternatively, the representation of the fingerprint image may be the image itself, or a compressed version of the image. For example, the image may be binarized and/or skeletonized. Various ways of extracting such verification representation or enrolment representation from a fingerprint image are well-known to a person of ordinary skill in the relevant art. In one embodiment of the invention, the enrolment/verification representation further includes an enrolment/verification liveness parameter.

In summary, the present invention relates to a method of controlling a fingerprint sensing system for liveness authentication. The method comprising acquiring a first set of sensing signals and a second set of sensing signals from a fingerprint sensor in two different operational modes and subsequently provide a liveness authentication signal based on the first set of sensing signals and the second set of sensing signals. The invention also relates to a fingerprint sensing system and an electronic device.

BRIEF DESCRIPTION OF THE DRAWINGS

These and other aspects of the present invention will now be described in more detail, with reference to the appended drawings showing an example embodiment of the invention, wherein:

FIG. 2b is a schematic block diagram of the fingerprint sensing system in FIG. 2a;

FIG. 5b is a schematic block diagram of the fingerprint sensing system in FIG. 5a;

DETAILED DESCRIPTION OF EXAMPLE EMBODIMENTS

In the present detailed description, various embodiments of the fingerprint sensing system and method according to the present invention are mainly described with reference to a fingerprint sensing system that is packaged to be connectable to an electronic device by a flexible printed circuit. Although this is convenient for many applications, it should be noted that many other kinds of electronics packages may be suitable for embodiments of the fingerprint sensing system depending on application. In embodiments, the fingerprint sensing system may also be unpackaged, or the electronic device may be a part of the packaging, such as may be the case when the electronic device is, for example, a smart card.

Figure 1:
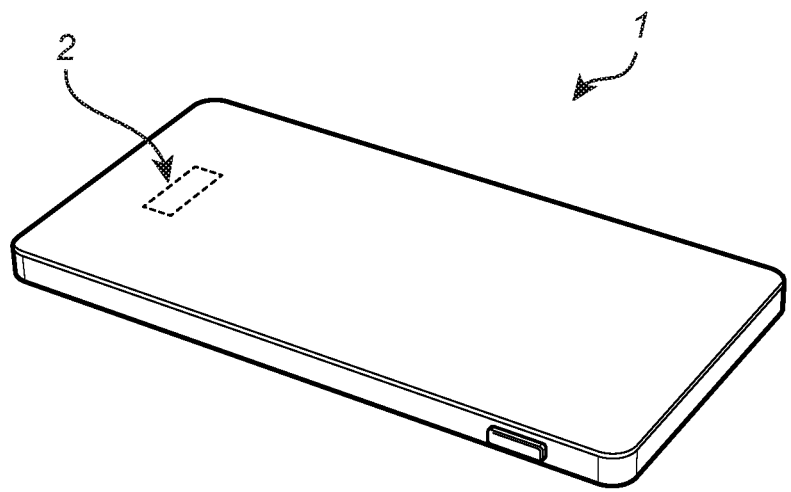
FIG. 1 schematically illustrates a mobile phone comprising a fingerprint sensing system according to an example embodiment of the present invention.

FIG. 1 schematically illustrates an application for a fingerprint sensing device according to an example embodiment of the present invention, in the form of a mobile phone 1 with an integrated fingerprint sensing system 2. The fingerprint sensing system 2 may, for example, be used for unlocking the mobile phone 1 and/or for authorizing transactions carried out using the mobile phone, etc.

Figure 2A:
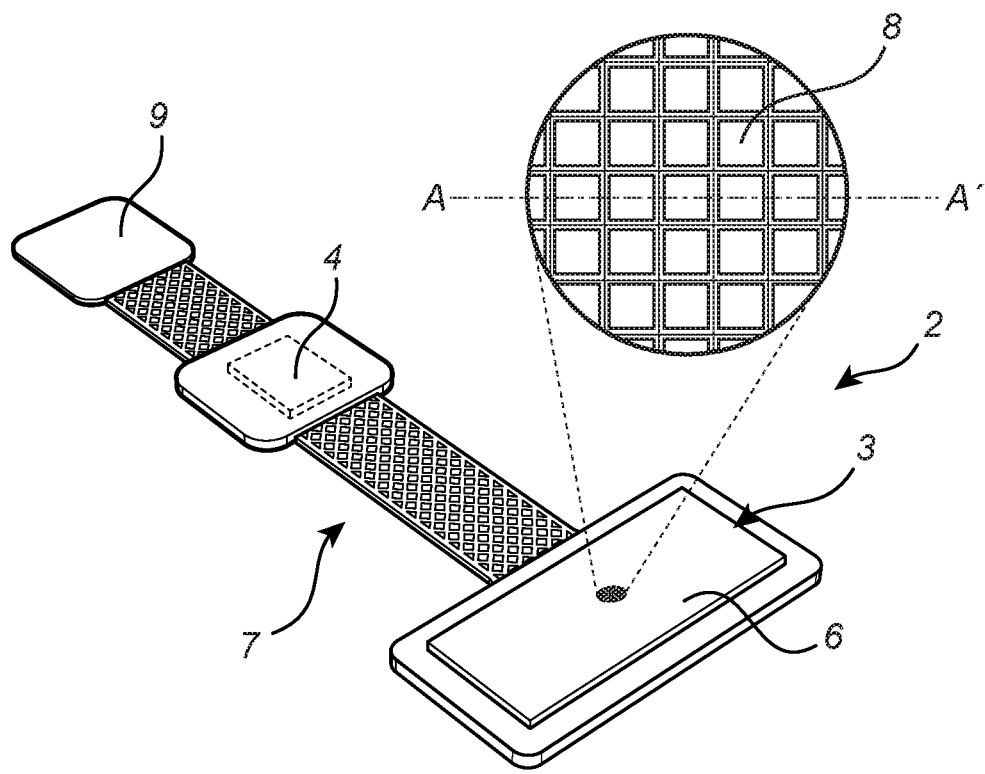
FIG. 2a schematically shows a first embodiment of the fingerprint sensing system comprised in the electronic device in FIG. 1.

FIG. 2a schematically shows a first embodiment of the fingerprint sensing system 2 comprised in the mobile phone 1 in FIG. 1. As can be seen in FIG. 2a, the fingerprint sensing system 2 comprises a fingerprint sensor 3 and an interface circuit 4. In the present exemplary embodiment, the fingerprint sensor 3 is shown to be coated with a dielectric structure in the form of a protective coating 6. Depending on the application, the protective coating 6 may have different properties. If the fingerprint sensor 3 is to be arranged under the cover glass of a mobile phone 1, then the protective coating 6 may be rather thin, since the cover glass will offer protection for the fingerprint sensor 3. In other applications, where the protective coating 6 is to be directly touched by the user's finger, the protective coating may be rather thick. For instance, the fingerprint sensor 3 may be overmolded by a suitable polymer used in the electronics packaging industry.

In the present exemplary embodiment, the fingerprint sensor 3 is connected to the interface circuit 4, and the interface circuit 4 is connectable to an electronic device (such as the mobile phone 1 in FIG. 1) via a flex circuit 7 with a connector 9.

As is schematically indicated in FIG. 2a, the fingerprint sensor 3 comprises a large number of sensing elements 8 (only one of the sensing elements has been indicated with a reference numeral to avoid cluttering the drawing), each being controllable to sense a distance between a sensing structure (top plate) comprised in the sensing element 8 and the surface of a finger contacting the top surface of the fingerprint sensor 3.

The fingerprint sensor 3 in FIG. 2 may advantageously be manufactured using CMOS technology, but other techniques and processes may also be feasible. For instance, an insulating substrate may be used and/or thin-film technology may be utilized for some or all process steps needed to manufacture the fingerprint sensor 3.

Figure 2B:
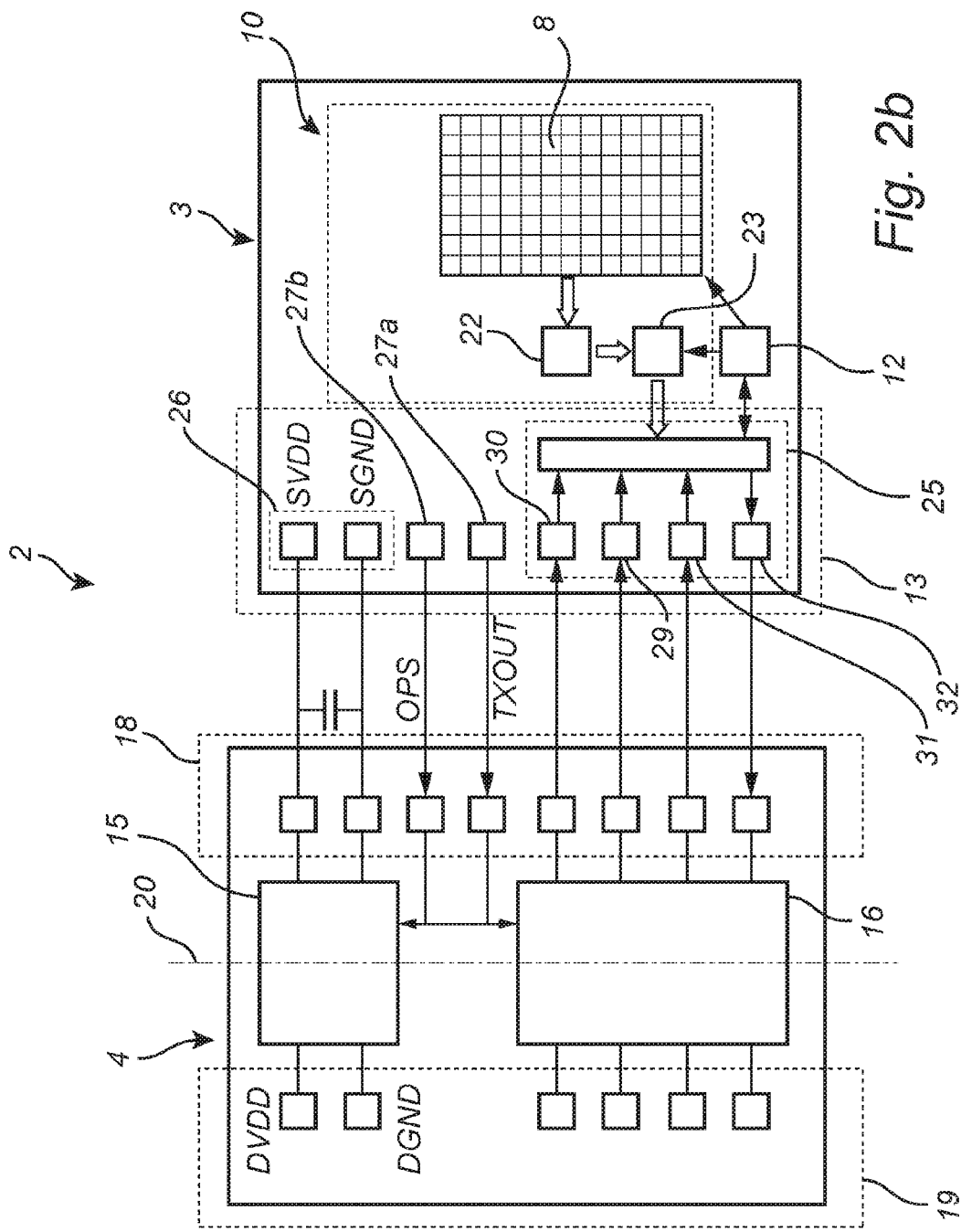

With reference to FIG. 2b, which is a simplified schematic block diagram of the first embodiment of the fingerprint sensing system 2 in FIG. 2a, the fingerprint sensor 3 comprises a sensing arrangement 10, a sensing arrangement controller 12, and a sensing arrangement interface 13. The interface circuit 4 comprises, as is indicated in FIG. 2b, supply circuitry 15, level shifting circuitry 16, a sensor connection interface 18, and a device connection interface 19. The sensor connection interface 18 is in a first voltage domain of the interface circuit 4 having the same reference potential as the fingerprint sensor 3, and the device connection interface 19 is in a second voltage domain of the interface circuit 4 referenced to the device reference potential of the electronic device 1. The border between the first voltage domain and the second voltage domain is schematically indicated in FIG. 2b by the vertical dashed line 20 passing through the supply circuitry 15.

Turning again to the fingerprint sensor 3 in FIG. 2b, the sensing arrangement 10 comprises the above-mentioned sensing elements 8, sampling circuitry 22 for sampling sensing signals output by the sensing elements 8, and an analog-to-digital converter (ADC) 23 for converting the analog signal values sampled by the sampling circuitry 22 to digital values that may constitute a fingerprint pattern signal, such as a fingerprint image. The sensing arrangement interface 13 comprises a sensor communication interface 25, a sensor voltage supply interface 26, a timing output 27a.

In the embodiment of FIGS. 2a-b, the sensor communication interface 25, which may for example, be an SPI slave interface, passes the fingerprint pattern signal from the ADC 23 to the electronic device 1 via the interface circuitry 4, and sensor control signals originating from the electronic device 1 to the sensing arrangement controller 12.

The sensor communication interface 25 is illustrated as a simplified SPI (serial peripheral interface) port comprising a serial clock input (SCK) 29, a master output slave input (MOSI) 30, a slave select input (CS) 31; and a master input slave output (MISO) 32.

The sensor voltage supply interface 26 receives a supply voltage from the interface circuit 4 as the substantially constant difference between a sensor ground potential SGND and a sensor supply potential SVDD. The sensor ground potential SGND and the sensor supply potential SVDD vary together in relation to device ground DGND.

Through the timing output 27a, the fingerprint sensor 3 provides a timing signal TXOUT to the interface circuit 4, to allow the operation of the interface circuit to be timed with the operation of the sensing arrangement 10.

In the simplified example of FIG. 2b, the device connection interface 19 of the interface circuit 4 comprises inputs for receiving the device ground potential DGND and the device supply potential DVDD, and an SPI-interface for allowing communication between the electronic device 1 and the fingerprint sensor 3 via the interface circuit 4 as well as between the electronic device 1 and the interface circuit 4.

The sensor connection interface 18 of the interface circuit 4 is connected to the sensing arrangement interface 13 of the fingerprint sensor 3 for providing the sensor ground potential SGND and the sensor supply potential SVDD to the fingerprint sensor 3, for allowing communication with the fingerprint sensor 3 and for receiving the timing signal TXOUT provided by the sensor. As is schematically indicated in FIG. 2b, the timing signal TXOUT is used for controlling operation of the supply circuitry 15 and the level shifting circuitry 16. Furthermore, a signal from the sensor communication interface 25 (e.g. SPI port) may be used for controlling of a switch between the first operational mode and the second operational mode, or a control signal via the optional OPS port 27b could be used (operation signal port, OPS, for controlling the switching operation). Alternatively, when the fingerprint sensor 3 is prompted to acquire a fingerprint image, and a timing signal TXOUT is received by the interface circuit 4, a sequence of imaging is initiated including fingerprint imaging in the first mode followed by imaging in the second mode, or vice versa.

An example configuration of the sensing arrangement 10 and the provision of the fingerprint sensing signal from the sensing arrangement for the fingerprint sensing system in FIG. 2a will now be described with reference to FIG. 3.

Figure 3:
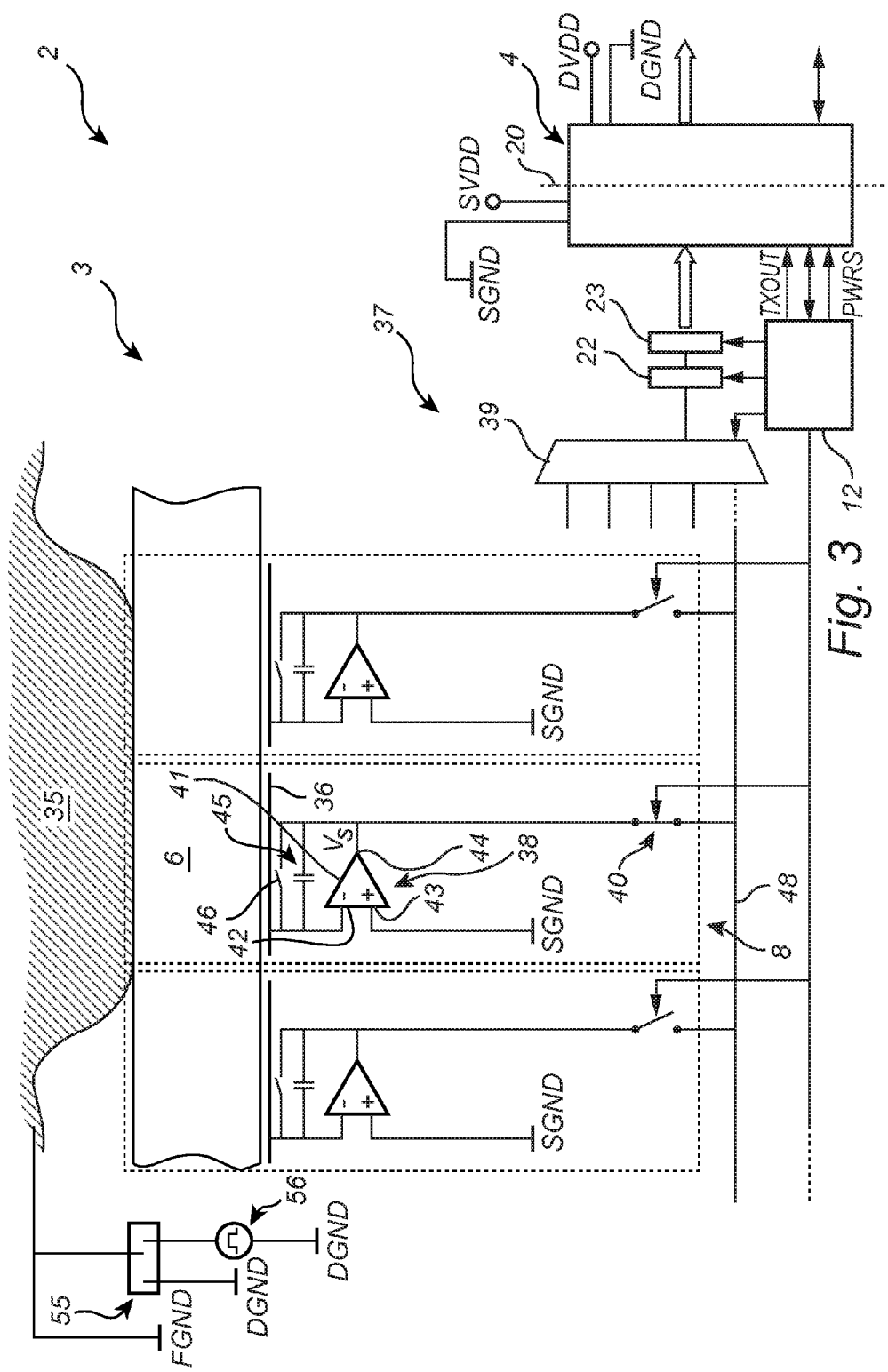
FIG. 3 is a schematic cross-section view of a portion of the fingerprint sensing system in FIG. 2a illustrating an example configuration of the sensing arrangement and the provision of the fingerprint sensing signal from the sensing arrangement.

FIG. 3 is a schematic cross section view of a portion of the fingerprint sensing system 2 in FIG. 2a, taken along the line A-A' as indicated in FIG. 2a with a finger 35 placed on top of the fingerprint sensor 3. The finger 35 has a finger potential FGND. As is schematically shown in FIG. 3, the fingerprint sensor 3 comprises a plurality of sensing structures 36, here in the form of metal plates underneath the dielectric structure 6, and read-out circuitry 37 connected to each of the sensing structures 36. In the example embodiment of FIG. 3, the read-out circuitry comprises a plurality of charge amplifiers 38, a multiplexer 39, the above-mentioned sampling circuitry 22, the above-mentioned ADC 23, and selection circuitry, here functionally illustrated as a simple selection switch 40 for allowing selection/activation of different sensing elements 8.

The charge amplifier 38 comprises at least one amplifier stage, here schematically illustrated as an operational amplifier (op amp) 41 having a first input (negative input) 42 connected to the sensing structure 36, a second input (positive input) 43 connected to sensor ground SGND, and an output 44. In addition, the charge amplifier 38 comprises a feedback capacitor 45 connected between the first input 42 and the output 44, and reset circuitry, here functionally illustrated as a switch 46, for allowing controllable discharge of the feedback capacitor 45. The charge amplifier 38 may be reset by operating the reset circuitry 46 to discharge the feedback capacitor 45.

As is often the case for an op amp 41, the potential at the first input 42 follows the potential applied to the second input 43. Depending on the particular amplifier configuration, the potential at the first input 42 may be substantially the same as the potential at the second input 43, or there may be a substantially fixed offset between the potential at the first input 42 and the potential at the second input 43.

In addition to the sensing arrangement comprising the sensing structures 36 and the read-out circuitry 37 as described above, the fingerprint sensor 3 further comprises the sensing arrangement controller 12 as described above. In FIG. 3, the sensing arrangement controller 12 is shown to control the selection circuitry 40, the multiplexer 39, the sampling circuitry 22 and the ADC 23.

FIG. 3 also schematically shows the interface circuit 4 connected to the fingerprint sensor 3 and to the rest of the electronic device 1 as described above with reference to FIG. 2a-b. As is schematically indicated in FIG. 3, the interface circuit 4 provides the above-mentioned sensing reference potential (SGND and SVDD) to the fingerprint sensor 3. In the simplified example of FIG. 3, the sensor ground potential is provided to the second input 43 of each charge amplifier 38 comprised in the read-out circuitry 37.

As is conceptually shown in the simplified example of FIG. 3, a switching circuit 55 is configured to control a finger drive electrode (not shown) being in contact with the finger 35 such that, in the first operational mode, the finger potential FGND is substantially constant in relation to the device reference potential DGND, and in the second operational mode, the finger potential is alternated relative the device reference potential DGND.

At least when the fingerprint sensing system 2 is in the first operation mode, the interface circuit 4 provides the sensing reference potential (SGND) to the fingerprint sensor 3 in the form of a sensing reference signal alternating, in relation to the device reference potential DGND, between a first sensing reference potential $V_L$ and a second sensing reference potential $V_H$. In the first operational mode the finger potential FGND is substantially constant in relation to the device reference potential DGND (for example through an electrical connection between the electronic device and the hand of the user), and the potential of the sensing structure 36 substantially follows the potential at the second input 43 of the charge amplifier 38, the time-varying, in relation to the device reference potential DGND, potential SGND at the second input 43 results in a time-varying potential difference between the sensing structure 36 and the finger 35.

In the second operational mode, the switching circuitry is configured to connect the finger to a supply circuitry 56 which provides the sensing reference potential directly to the finger drive electrode such that the finger potential alternates in relation to the device reference potential DGND between a third sensing reference potential $V_L$ and a fourth sensing reference potential $V_H$. The implementation of the supply circuitry 56 may be achieved in various ways. For example, the TX-OUT could be directly applied to the finger drive electrode, or a separate power supply could be used, which would be controlled also by the TX-pulse, to apply the sensing reference potential to the finger drive electrode in the second operational mode. In addition, the sensing reference provided to the finger drive electrode could be controlled by the interface circuitry 4 and thus provided from the supply circuitry 15.

Furthermore, in the second operational mode the sensing structure potential does not follow a sensing reference potential of the finger drive electrode such that an alternation of the finger potential with respect to the sensing structure is obtained.

A change in potential difference between the sensing structure 36 and the finger 35 will in turn result in a change of the charge carried by the sensing structure 36 that is indicative of the capacitive coupling between the finger 35 and the sensing structure (plate) 36. The sensing signal $V_s$ provided at the output 44 of the charge amplifier 38 will be indicative of this change of charge carried by the sensing structure 36 and thus of the local capacitive coupling between the finger 35 and the sensing structure 36.

Between sensing operations, the feedback capacitor 45 needs to be reset (the charge across the feedback capacitor 45 is equalized). This is carried out using the reset switch 46.

When the indicated sensing element 8 is selected for sensing, the selection switch 40 is closed to connect the output of the charge amplifier to the readout line 48. The readout line 48 is connected to the multiplexer 39. As is schematically indicated in FIG. 3, additional readout lines providing sensing signals from other groups of sensing elements are also connected to the multiplexer 39.

At least the operation of the reset switch 46 and the sampling of the sensing signal $V_s$ need to be synchronized with changes of the sensor ground potential SGND in relation to the device ground potential DGND. In the example embodiment of FIG. 3, this synchronization is handled by the sensing arrangement controller 12 that controls the timing of the reset switch 46 and provides the above-mentioned timing signal TXOUT to the interface circuit to thereby control the timing of the transitions of the sensing reference potential SGND from the first sensing reference potential VL to the second sensing reference potential VH, or from the second sensing reference potential VH to the first sensing reference potential VL, in relation to the timing of the reset switch 46.

As is schematically indicated in FIG. 3, the sensing arrangement controller also controls the timing of the sampling of the sensing signal $V_s$ by the sampling circuit 22 and the ND-conversion of the sampled sensing signals by the ADC 23.

An exemplary timing relation between sensing reference signal SGND, operation of the reset switch 46 and sampling of the sensing signal $V_s$ using the sampling circuit 22 will be described below with reference to FIGS. 4a-b.

Figure 4A:
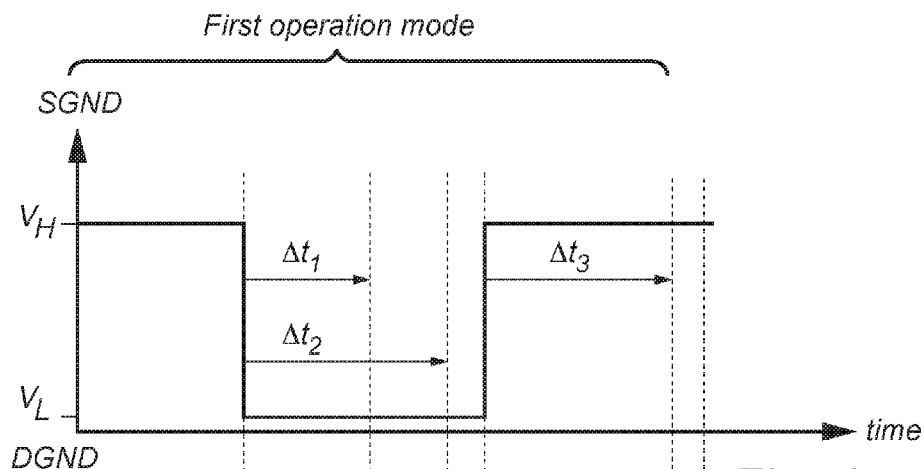
FIGS. 4a-c are graphs schematically illustrating the relation between the sensing reference potential and the sensing signal output by the charge amplifier in FIG. 3, as well as exemplary sampling times.

FIG. 4a shows the sensing reference potential (the sensor ground potential SGND) in relation to the device ground potential DGND in the first operational mode and in the second operational mode. As described above, the potential of the sensing structure 36 in relation to the device ground potential DGND will exhibit substantially the same behavior, and FIG. 4b schematically shows the sensing signal $V_s$.

Referring first to FIG. 4a, in the first operational mode the sensor ground potential SGND goes from the second sensing reference potential $V_H$ to the first sensing reference potential $V_L$, in relation to the device ground potential DGND, at $T_1$, and then goes back from $V_L$ to $V_H$ at $T_2$. These transitions are controlled by the timing signal TXOUT provided from the fingerprint sensor 3 to the interface circuit 4.

A first delay $\Delta t_1$ after first transition, at $T_1$, the reset switch 46 is operated to bring the charge amplifier 38 to such a state (enabled state) that the output provides a signal if the charge on the sensing plate 36 changes. A second delay $\Delta t_2$ after first transition, the sampling circuit 22 is controlled to sample the sensing signal a first time, resulting in a first sampled value $S_1$.

When the sensor ground potential SGND goes from low to high at $T_2$, there will be a change in the charge on the sensing plate 36 resulting from capacitive coupling with the finger 35. This change in charge is translated into a change in the voltage provided by the charge amplifier 38, that is, a change in the sensing signal $V_s$.

Figure 4B:
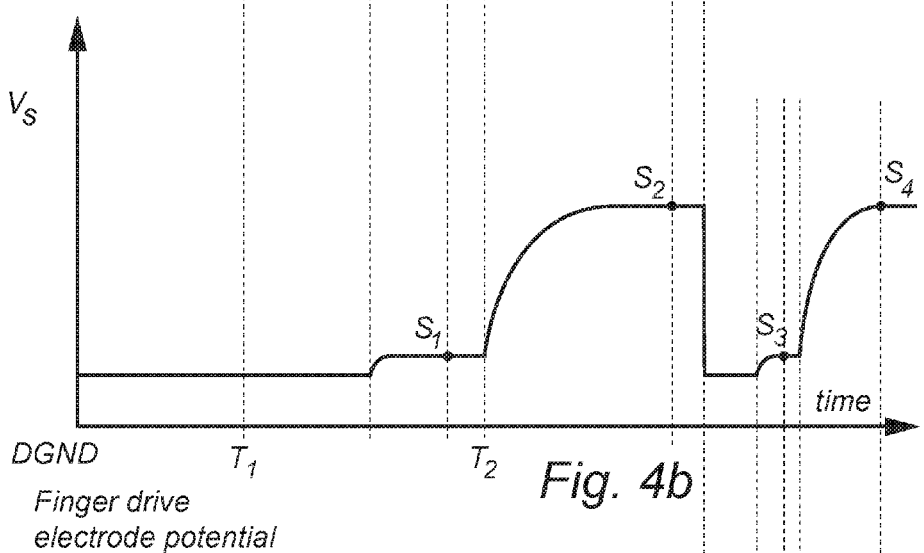

A third delay $\Delta t_3$ after the second transition, at $T_2$, the sampling circuit 22 is controlled to sample the sensing signal a second time, resulting in a second sampled value $S_2$ indicated in FIG. 4b. The difference between $S_2$ and $S_1$ is a measure indicative of the capacitive coupling between the sensing plate 36 and the finger 35.

Figure 4C:

Now with reference to FIG. 4c, at time $T_3$, the fingerprint sensor is operational in the second operational mode. After a delay $\Delta t_4$ from the transition to the second operation mode (at time $T_3$) the reset switch 46 is again operated to bring the charge amplifier 38 to such a state (enabled state) that the output provides a signal if the charge on the sensing plate 36 changes. A fifth delay $\Delta t_5$ after the transition at $T_3$, the sampling circuit 22 is controlled to sample the sensing signal a first time in the second operation mode, resulting in a third sampled value $S_3$ indicated in FIG. 4b.

When the sensing reference potential provided to the finger drive electrode goes from the third sensing reference potential VL' to the fourth sensing reference potential VH' (in this case from low to high) at $T_4$, there will be a change in the charge on the sensing plate 36 resulting from capacitive coupling with the finger 35. This change in charge is translated into a change in the voltage provided by the charge amplifier 38, that is, a change in the sensing signal $V_s$. Note that the sensing reference potential provided to the finger drive electrode may equally well go from high to low at $T_4$ in alternative timing sequences. In other words, the timing sequence shown in FIGS. 4a-4c is only shown for exemplary purposes.

After a delay $\Delta t_6$ after the transition, at $T_4$, the sampling circuit 22 is controlled to sample the sensing signal a fourth time, resulting in a fourth sampled value $S_4$. The difference between $S_4$ and $S_3$ is a measure indicative of the capacitive coupling between the sensing plate 36 and the finger 35 in the second operation mode.

Figure 5A:
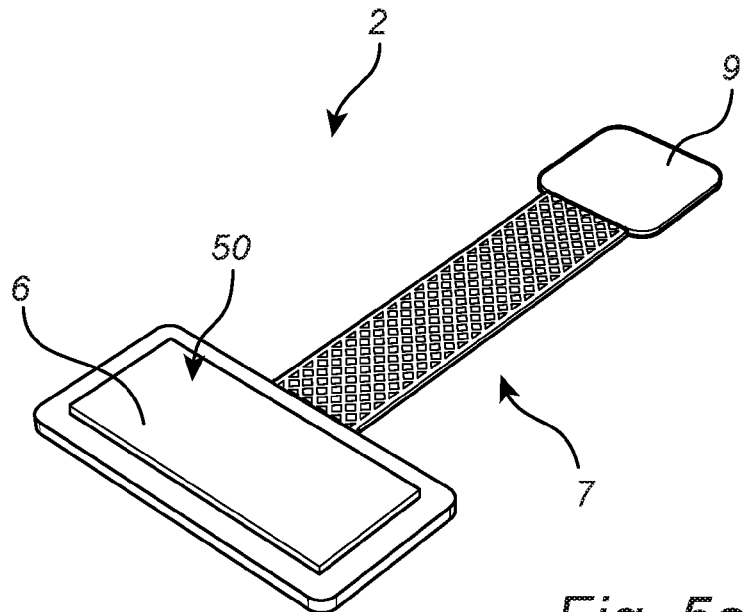
FIG. 5a schematically shows a second embodiment of the fingerprint sensing system comprised in the electronic device in FIG. 1.
Figure 5B:
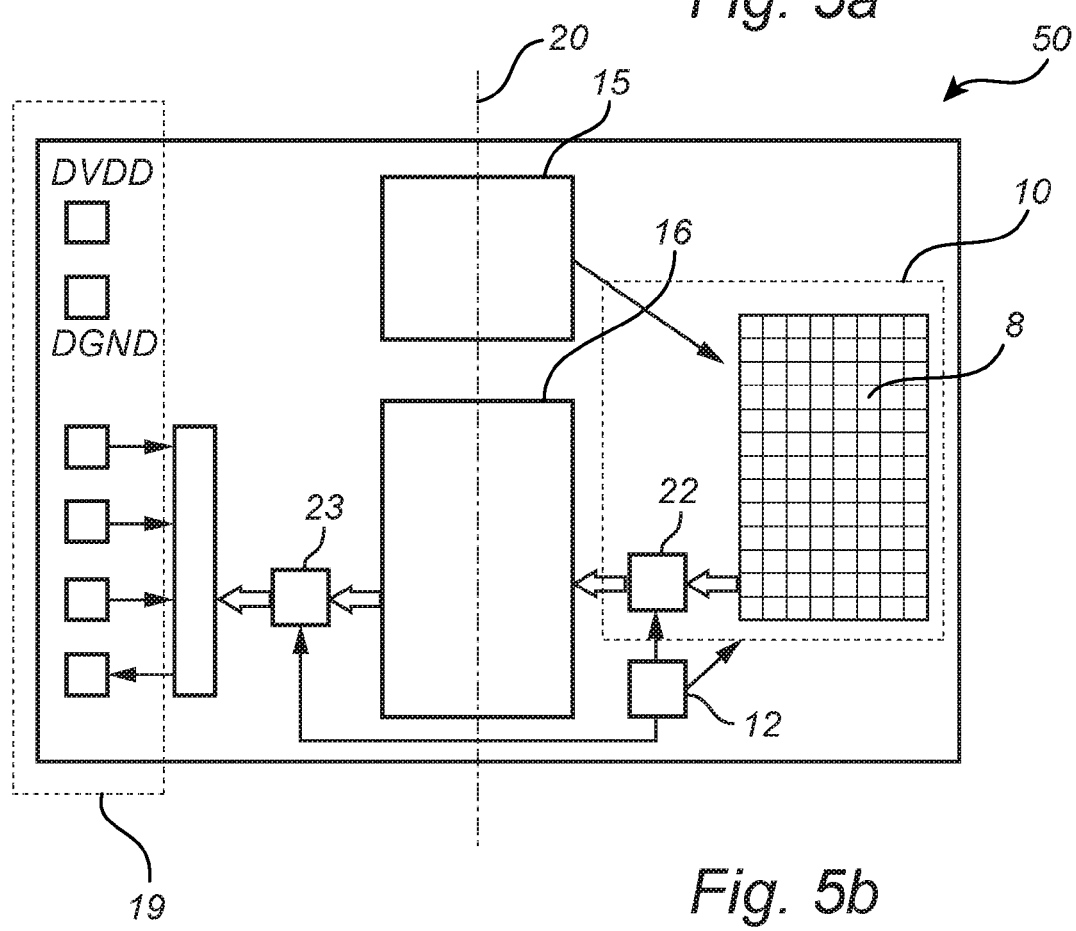

FIGS. 5a-b schematically show a second embodiment of the fingerprint sensing system 2 comprised in the mobile phone 1 in FIG. 1. The fingerprint sensing system 2 according to this second embodiment differs from that described above with reference to FIGS. 2a-b, FIG. 3 and FIGS. 4a-c in that the sensing arrangement 10, the device connection interface 19 and the supply circuitry 15 are all included in a single integrated circuit 50. Accordingly signals to and from the electronic device are provided directly from the fingerprint sensing system component 50 to the electronic device via the flex circuit 7 and the connector 9.

With reference to FIG. 5b, which is a simplified schematic block diagram of the second embodiment of the fingerprint sensing system 2 in FIG. 5a, the fingerprint sensing system component 50 comprises a sensing arrangement 10, a sensing arrangement controller 12, supply circuitry 15, a level shifting circuitry 16, and a device connection interface 19. The sensing arrangement 10 and the sensing arrangement controller 12 are in a first voltage domain, and the device connection interface 19 and the ADC 23 are in a second voltage domain referenced to the device reference potential of the electronic device 1. The border between the first voltage domain and the second voltage domain is schematically indicated in FIG. 5b by the vertical dashed line 20 passing through the supply circuitry 15 and the level shifting circuitry 16.

The sensing arrangement 10 comprises the above-mentioned sensing elements 8 and sampling circuitry 22 for sampling sensing signals output by the sensing elements 8. In the example embodiment of FIG. 5b, the values sampled by the sampling circuitry 22 are level shifted by the level shifting circuitry 16 before being provided to the analog-to-digital converter (ADC) 23.

In the embodiment of FIGS. 5a-b, the device connection interface 19 is illustrated as comprising inputs for receiving the device ground potential DGND and the device supply potential DVDD, and an SPI-interface for allowing communication between the electronic device 1 and the fingerprint sensing system component 50.

Figure 6:
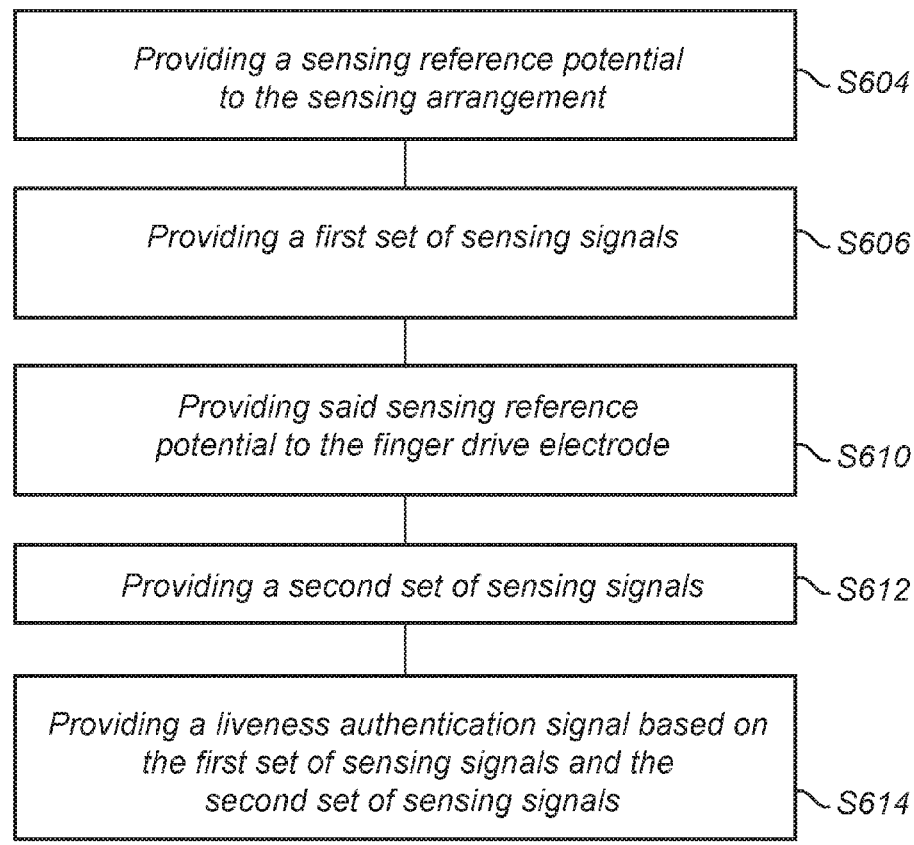
FIG. 6 shows a flow-chart with method steps according to an embodiment of the invention.

FIG. 6 is a flow-chart showing method steps according to an embodiment of the invention. The method steps may be implemented with a fingerprint sensing system according to embodiments of the invention. In a first step S604 providing the sensing reference potential to the sensing arrangement in the form of a sensing reference signal alternating, in relation to the device reference potential, between a first sensing reference potential and a second sensing reference potential, a change in potential difference, in relation to the device reference potential, between the first sensing reference potential and the second sensing reference potential resulting in the change in potential difference between the finger potential and the sensing structure potential. Next S606, a first set of sensing signals are provided to a control circuitry. Next, the sensing reference potential is provided to the finger drive electrode in step S610. In step S612 a second set of sensing signals is provided to the control circuitry. Based on the first set of sensing signals and the second set of sensing signals a liveness authentication is signal is provided in step S614.

Figure 7:
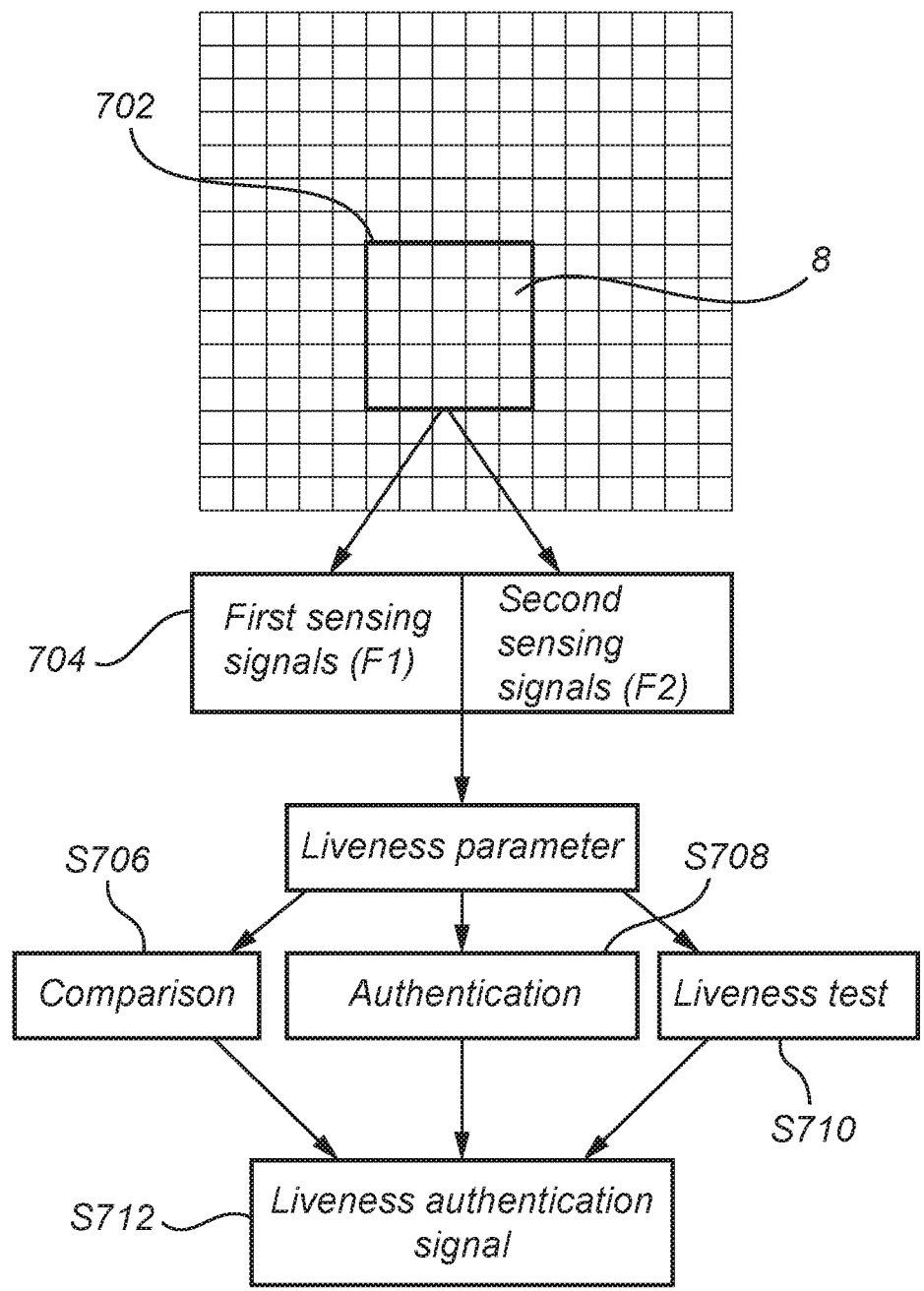
FIG. 7 is flow-chart illustrating an overview of various embodiments of the invention.

FIG. 7 conceptually illustrates a schematic overview of embodiments of the invention. Sensing signals are acquired from at least a sub-array 702 of sensing elements 8 of the fingerprint sensor. The first sensing signals (F1) and the second sensing signals (F2) may be acquired (S704) using the same sensing structures. In other words, the first sensing signals (F1) and the second sensing signals (F2) may be acquired from the same pixels 8 of the fingerprint sensor 3 but in different operational modes. Based on the first sensing signals (F1) and the second sensing signals (F2) a liveness authentication signal may be provided (S712) which is indicative of whether the object sensed with the sub-array 702 of sensing elements 8 of the fingerprint sensor is a live finger or made from a spoof material. If a spoof is present having a certain resistivity, the relation between the first sensing signals (F1) and the second sensing signals (F2) will be given according to the certain resistivity. If a live finger is present, the corresponding relation will be according to a resistivity of a live finger. The relations between the first sensing signals (F1) and the second sensing signals (F2) may be empirically determined using different spoof materials and a live finger. The liveness authentication signal may be provided from several procedures such as indicated in FIG. 7 including but not limited to a comparison procedure (S706), included in a fingerprint authentication procedure (S708), or as part of a separate liveness test (S710). These will now be described in more detail with reference to FIGS. 8-10.

Figure 8:
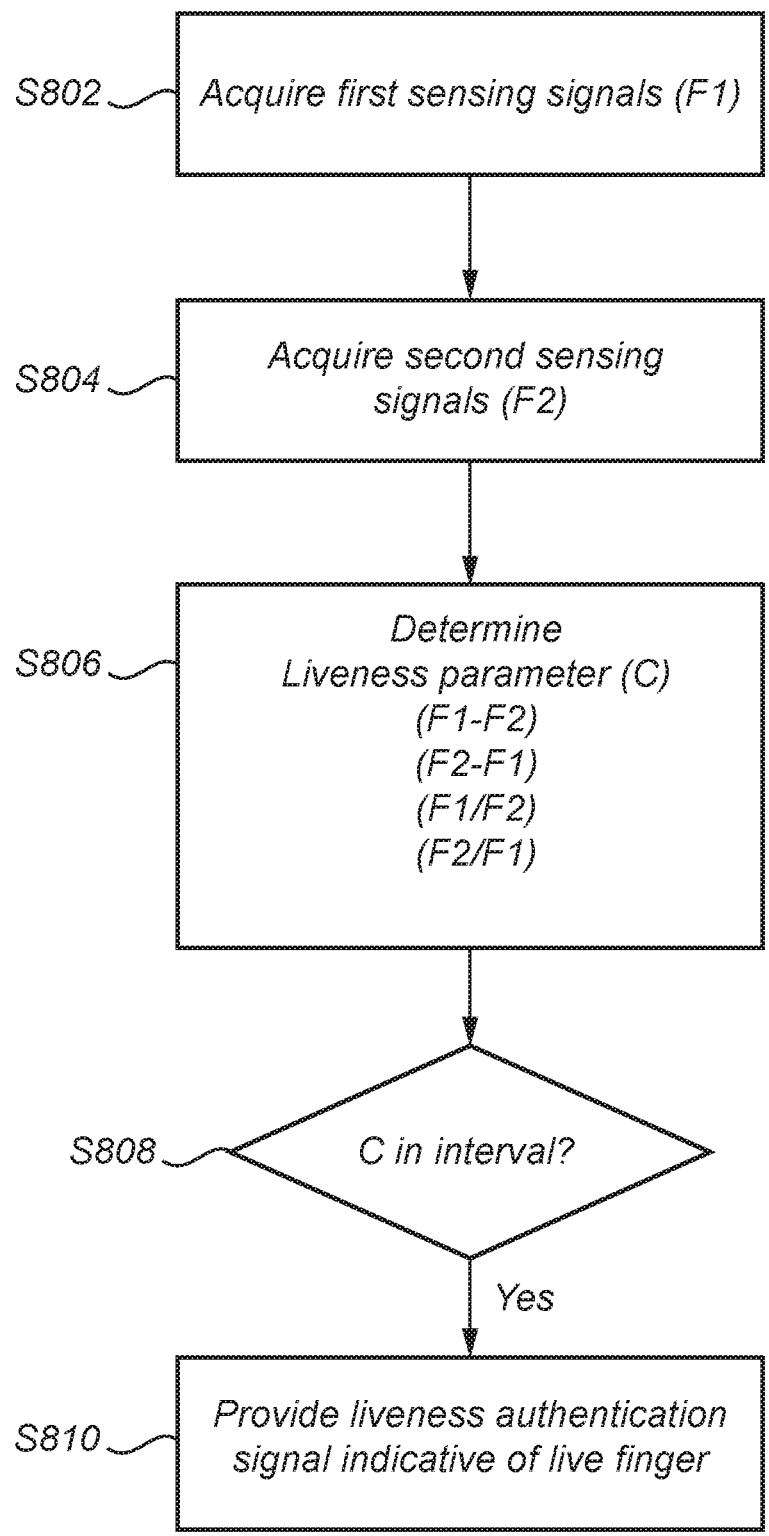
FIG. 8 shows a flow-chart with method steps according to an embodiment of the invention.

One exemplary embodiment is schematically illustrated in the flow-chart in FIG. 8. The first set of sensing signals (F1) are acquired in step S802 and the second set of sensing signals is acquired in step S804. A liveness parameter is formed in step S806 based on a comparison between the first sensing signals and the second sensing signals, for example a comparison may be a difference or a ratio between a first signal in the first set of sensing signals and a second signal in the second set of sensing signals. The first and the second signal are acquired from the same sensing element but in different operation modes of the fingerprint sensor (i.e. the first and the second operation mode). The comparison value may alternatively be formed between a difference or a ratio of a first accumulated value of the first set of sensing signals and a second accumulated value of the second set of sensing signals. The accumulated value may for example be a sum of the sensing signals in the respective operation mode. In step S808 it is determined whether C lies in an accepted interval, in other words, if C is above a first threshold and below a second threshold where the second threshold is higher than the first threshold. If C lies in the accepted interval, a liveness authentication signal is provided indicative of a live finger. The liveness parameter based on the comparison may be finger specific, i.e. based on a specific user's fingerprint, or it may be global, e.g. based on more general fingerprint pattern characteristics not specific to a certain user. Optionally, if C does not lie in the accepted interval, a signal indicative of the presence of a spoof may be provided whereby appropriate action may be taken by the electronic device.

The threshold C may be determined from empirically testing with different spoof materials and comparing with live fingers. In other words, imaging spoofs of different materials in the first operational mode and in the second operational mode, and a live finger in the first operational mode and in the second operational mode, and compare the respective sensing signals, and store the result for future liveness evaluations.

Figure 9:
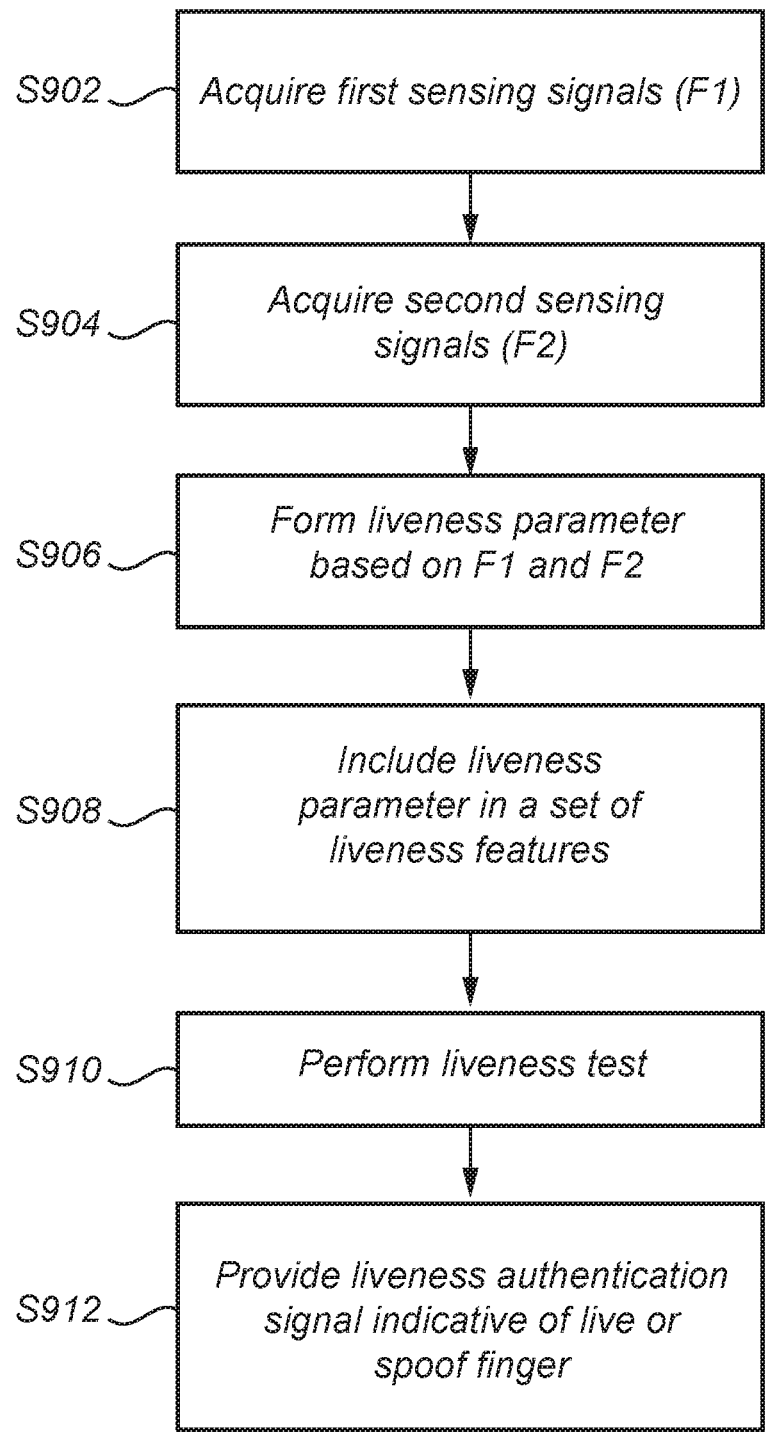
FIG. 9 shows a flow-chart with method steps according to an embodiment of the invention.

The flow-chart in FIG. 9 includes method steps according to an embodiment of the invention. The first set of sensing signals (F1) are acquired in step S902 and the second set of sensing signals is acquired in step S904. A liveness parameter is formed in step S906 based on F1 and F2. The liveness parameter is subsequently included in a liveness test including a set of liveness features in step S908. The set of liveness features can comprise measurements of finger conductivity, or capacitance, measurements from the fingerprint image itself such as textures along ridges in the fingerprint image, textures along valleys in the fingerprint image, or information relating to transitions from valley to ridge. In addition, if the liveness test is performed based on a specific finger (i.e. not global features) where a matching has been performed (or is performed unified with the liveness test) information from the relocation process of the verification features during fingerprint authentication may also be utilized. Such information may be for instance unnatural deformation of feature positions or deviations in correlation metrics that suggests unnatural texture changes at the location of the feature point. For example, in step S910 the liveness test is performed and depending on the outcome of the liveness test, a signal indicative of a live of spoof finger is provided in step S912. Also in this case, the liveness test using the liveness parameter may be empirically trained. Further, the liveness parameter may also in this case be a difference between F1 and F2 (or vice versa) or a ratio between F1 and F2 (or vice versa), although other alternatives may also be possible, such as for example comparing measurements from the fingerprint images in the two different modes related to ridge and/or valley feature differences, texture differences, or information related to differences in transitions from valley to ridge.

Figure 10:
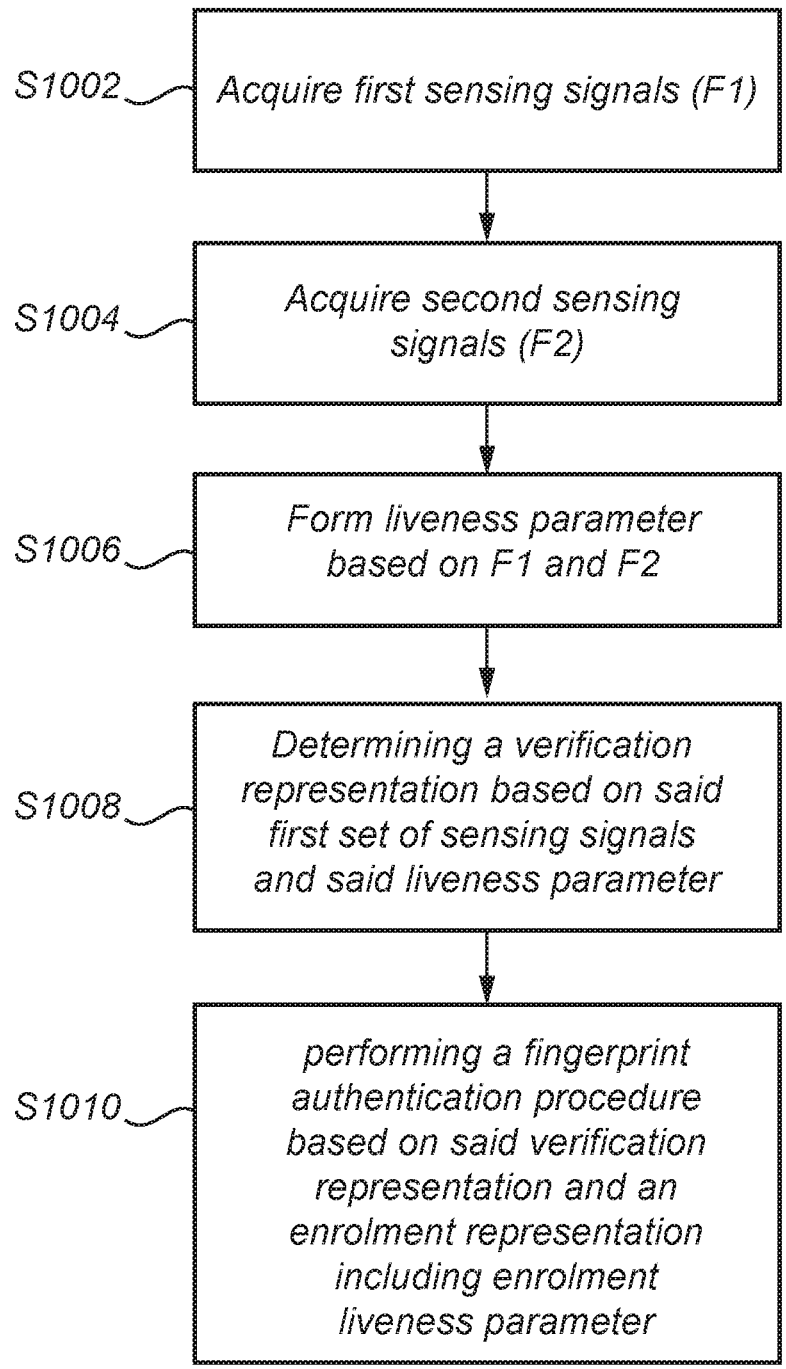
FIG. 10 shows a flow-chart with method steps according to an embodiment of the invention.

In a further embodiment schematically illustrated with the flow-chart of FIG. 10, the liveness parameter is included in the enrolment and the authentication procedure. Accordingly, the first set of sensing signals (F1) are acquired in step S1002 and the second set of sensing signals is acquired in step S1004. A liveness parameter is formed in step S1006 based on F1 and F2. In step S1008, a verification representation is determined from the first set of sensing signals, or alternatively the verification representation may be determined from the second set of sensing signals. The verification representation further includes the liveness parameter. During enrolment of the user, an enrolment liveness parameter was determined with the described method along with enrolment sensing signals (from which a fingerprint image may be formed). Thus, during enrolment, a liveness parameter specific for the enrolment template (i.e. enrolled user) is acquired. Subsequently, during fingerprint authentication S1010, verification liveness parameter is matched with the enrolment liveness parameter. Thus, the lives parameter adds another security measure for authentication of a specific user fingerprint. The liveness parameter may also in this case be a difference between F1 and F2 (or vice versa) or a ratio between F1 and F2 (or vice versa), although other alternatives may also be possible as outlined with reference to FIG. 9.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method of controlling a fingerprint sensing system for liveness authentication, said fingerprint sensing system comprising:
 a device connection interface for connection of said fingerprint sensing system to an electronic device, said device connection interface including a device reference potential input for receiving a device reference potential from said electronic device;
 a sensing arrangement including:
  a plurality of sensing structures, each being covered by a dielectric structure and being arranged to capacitively couple to said finger when said finger is placed on said dielectric structure; and
  read-out circuitry connected to each of said sensing structures for providing sensing signals indicative of a capacitive coupling between each sensing structure and said finger in response to a change in potential difference between a sensing structure potential of said sensing structure and a finger potential of said finger, said read-out circuitry being connected to each of said sensing structures in such a way that said sensing structure potential follows a sensing reference potential of said sensing arrangement, a finger drive structure arranged adjacent to said sensing structures for making electrical contact with said finger when sensing said fingerprint pattern; and supply circuitry connected to said sensing arrangement for providing, to said sensing arrangement, said sensing reference potential, wherein said method comprises:
- a) providing said sensing reference potential to the sensing arrangement in the form of a sensing reference signal alternating, in relation to said device reference potential, between a first sensing reference potential and a second sensing reference potential, a change in potential difference, in relation to said device reference potential, between said first sensing reference potential and said second sensing reference potential resulting in said change in potential difference between said finger potential and said sensing structure potential;
- b) providing a first set of sensing signals to a control circuitry;
- c) providing said sensing reference potential to the finger drive electrode in the form of a sensing reference signal alternating, in relation to said device reference potential, between a third sensing reference potential and a fourth sensing reference potential, a change in potential difference, in relation to said device reference potential, between said third sensing reference potential and said fourth sensing reference potential resulting in said change in potential difference between said finger potential and said sensing structure potential,
- d) providing a second set of sensing signals to said control circuitry;
- e) providing a liveness authentication signal based on the first set of sensing signals and the second set of sensing signals.

2. The method according to claim 1, wherein said first set of sensing signals and said second set of sensing signals are acquired from capacitive coupling between the finger and the same set of sensing structures.

3. The method according to claim 1, wherein said liveness authentication signal is based on a liveness parameter determined based on a comparison between a first signal of said first set of sensing signals and a second signal of said second set of sensing signals, wherein the method comprises:
when said liveness parameter is in a threshold interval, providing said liveness authentication signal indicative of a live finger.

4. The method according to claim 1, wherein said liveness authentication signal is based on a liveness parameter determined based on a comparison between a first accumulated value of said first set of sensing signals and a second accumulated value of said second set of sensing signals, wherein the method comprises:
when said liveness parameter is in a threshold interval, providing said liveness authentication signal indicative of a live finger.

5. The method according to claim 1, comprising:
determining a liveness parameter based on the first set of sensing signals and the second set of sensing signals, including said liveness parameter in a set of liveness features,
applying a liveness test on the set of liveness features, and based on the test, provide said liveness authentication signal indicative of a live finger or a spoof finger.

6. The method according to claim 1, comprising:
determining a liveness parameter based on the first set of sensing signals and the second set of sensing signals,
determining a verification representation based on said first set of sensing signals and said liveness parameter,
performing a fingerprint authentication procedure based on said verification representation and an enrolment representation indicative of a fingerprint pattern, said enrolment representation including an enrolment liveness parameter based on a first set of enrolment sensing signals provided in said first operational mode and a second set of enrolment sensing signals provided in said second operational mode.

7. A fingerprint sensing system for sensing a fingerprint pattern of a finger, said fingerprint sensing system comprising:
a device connection interface for connection of said fingerprint sensing system to an electronic device, said device connection interface including a device reference potential input for receiving a device reference potential from said electronic device;
a sensing arrangement including:
- a plurality of sensing structures, each being covered by a dielectric structure and being arranged to capacitively couple to said finger when said finger is placed on said dielectric structure;
- read-out circuitry connected to each of said sensing structures for providing sensing signals indicative of a capacitive coupling between each sensing structure and said finger in response to a change in potential difference between a sensing structure potential of said sensing structure and a finger potential of said finger,
- a finger drive structure arranged adjacent to said sensing structures for making electrical contact with said finger when sensing said fingerprint pattern,
supply circuitry connected to said sensing arrangement for providing, to said sensing arrangement, said sensing reference potential,
wherein said sensing arrangement further comprises a sensing arrangement controller for controlling said sensing arrangement between:
- a first sensing arrangement operational mode in which said read-out circuitry is connected to each of said sensing structures in such a way that said sensing structure potential follows a sensing reference potential of said sensing arrangement, wherein said sensing reference potential is provided in the form of a sensing reference signal alternating, in relation to said device reference potential, between a first sensing reference potential and a second sensing reference potential, a change in potential difference, in relation to said device reference potential, between said first sensing reference potential and said second sensing reference potential resulting in said change in potential difference between said finger potential and said sensing structure potential, wherein a first set of sensing signals is provided by said read-out circuitry, and
- a second sensing arrangement operational mode in which said sensing reference potential is provided to the finger drive electrode in the form of a sensing reference signal alternating, in relation to said device reference potential, between a third sensing reference potential and a fourth sensing reference potential, a change in potential difference, in relation to said device reference potential, between said first sensing reference potential and said second sensing reference potential resulting in said change in potential difference between said finger potential and said sensing structure potential, wherein a second set of sensing signals is provided by said read-out circuitry, and control circuitry configured to determine a liveness parameter based on the first set of sensing signals and the second set of sensing signals, and based on said liveness parameter, provide a liveness authentication signal.

8. The fingerprint sensing system according to claim 7, wherein the same set of sensing structures are used in said first mode and in said second mode for sensing said first sensing signals and said second sensing signals.

9. The fingerprint sensing system according to claim 7, wherein said liveness authentication signal is based on a liveness parameter determined based on a comparison between a first signal of said first set of sensing signals and a second signal of said second set of sensing signals, wherein, when said liveness parameter is determined to be in a threshold interval, said control circuitry is configured to provide said liveness authentication signal indicative of a live finger.

10. The fingerprint sensing system according to claim 7, wherein said liveness parameter is a comparison between a first accumulated value of said first set of sensing signals and a second accumulated value of said second set of sensing signals, wherein when said liveness parameter is in a threshold interval, said control circuitry is configured to provide said liveness authentication signal indicative of a live finger.

11. The fingerprint sensing system according to 7, wherein the control circuitry is configured to:
include said liveness parameter in a set of liveness parameters,
apply a liveness test on the set of liveness parameters, and based on the test, provide a liveness authentication signal indicative of a live finger or a spoof finger.

12. The fingerprint sensing system according to claim 7, wherein said control circuitry is configured to:
determine a verification representation based on said first set of signals and said liveness parameter,
perform a fingerprint authentication procedure based on said verification representation and an enrolment representation indicative of a user's fingerprint pattern, said enrolment representation including an enrolment liveness parameter based on a first set of enrolment sensing signals provided in said first operational mode and a second set of enrolment sensing signals provided in said second operational mode.

13. The fingerprint sensing system according to claim 7, wherein said read-out circuitry is configured to sense a change in charge carried by each of said sensing structures resulting from said change in potential difference, said read-out circuitry comprises:
a plurality of charge amplifiers, each being connected to at least one of said sensing structures for providing a sensing signal indicative of a change in charge carried by said at least one sensing structure, wherein each of said charge amplifiers comprises:
a first input connected to said at least one sensing structure;
a second input connected to said supply circuitry to receive said sensing reference potential;
an output providing said sensing signal;
a feedback capacitor connected between said first input and said output; and
at least one amplifier stage between said first and second inputs, and said output,
wherein said charge amplifier is configured in such a way that a potential at said first input substantially follows said sensing reference potential at said second input.

14. The fingerprint sensing system according to claim 13, wherein said read-out circuitry further comprises:
sampling circuitry connected to the output of each of said charge amplifiers for sampling said sensing signals at sampling times being related to changes of said sensing reference potential between said first sensing reference potential and said second sensing reference potential or between said third sensing reference potential and said fourth sensing reference potential.

15. The fingerprint sensing system according to claim 14, wherein the sampling circuitry may be controlled to sample the output a first time when the sensing reference potential is at either the first sensing reference potential or the second sensing reference potential, and a second time when the sensing reference potential is at the other one of the first sensing reference potential and the second sensing reference potential, and wherein the sampling circuitry may be controlled to sample the output a third time when the sensing reference potential is at either the third sensing reference potential or the fourth sensing reference potential, and a third time when the sensing reference potential is at the other one of the third sensing reference potential and the fourth sensing reference potential.

16. The fingerprint sensing system according to claim 7, wherein:
said sensing arrangement is included in a first integrated circuit; and
said device connection interface and said supply circuitry are included in a second integrated circuit coupled to said first integrated circuit.

17. The fingerprint sensing system according to claim 7, wherein:
said sensing arrangement, said device connection interface, and said supply circuitry are included in a single integrated circuit.

18. An electronic device comprising:
the fingerprint sensing system according to claim 7; and
processing circuitry configured to:
acquire said sensing signals and said liveness parameter from the fingerprint sensing system via said device connection interface;
authenticate a user based on said fingerprint pattern signal; and
perform at least one action only if said user is authenticated based on said sensing signals and said liveness parameter.

* * * * *